(12) United States Patent
Stekkelpak et al.

(10) Patent No.: US 10,530,898 B1
(45) Date of Patent: *Jan. 7, 2020

(54) SERVING A CONTENT ITEM BASED ON ACCEPTANCE OF A NEW FEATURE

(71) Applicant: Google LLC, Mountain View, CA (US)

(72) Inventors: Zoltan Stekkelpak, Mountain View, CA (US); Artem Chetverykov, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,581

(22) Filed: Feb. 21, 2018

Related U.S. Application Data

(63) Continuation of application No. 15/334,931, filed on Oct. 26, 2016, which is a continuation of application No. 13/663,950, filed on Oct. 30, 2012, now Pat. No. 9,495,686.

(51) Int. Cl.
*H04L 29/06* (2006.01)
*H04L 29/08* (2006.01)

(52) U.S. Cl.
CPC ............ *H04L 67/42* (2013.01); *H04L 67/303* (2013.01); *H04L 67/34* (2013.01)

(58) Field of Classification Search
CPC ........ H04L 67/42; H04L 67/303; H04L 67/34
USPC ....................................................... 709/203
See application file for complete search history.

(56) References Cited

U.S. PATENT DOCUMENTS

| | | | |
|---|---|---|---|
| 6,353,926 B1 | 3/2002 | Parthesarathy et al. | |
| 7,146,412 B2 | 12/2006 | Turnbull | |
| 7,809,740 B2* | 10/2010 | Chung | G06Q 30/02 707/758 |
| 8,280,769 B2 | 10/2012 | Walker et al. | |
| 8,418,205 B2 | 4/2013 | Lee et al. | |
| 8,843,406 B2 | 9/2014 | Aven et al. | |
| 8,949,889 B1* | 2/2015 | Erdmann | G06Q 30/00 725/22 |
| 9,807,217 B1* | 10/2017 | LeBeau | G06F 3/165 |
| 2004/0249700 A1* | 12/2004 | Gross | G06Q 30/02 705/7.31 |
| 2004/0249713 A1 | 12/2004 | Gross | |
| 2007/0169148 A1 | 7/2007 | Oddo et al. | |
| 2007/0174872 A1 | 7/2007 | Jing et al. | |
| 2007/0265870 A1* | 11/2007 | Song | G06Q 30/00 705/7.29 |
| 2009/0094095 A1 | 4/2009 | Slaney et al. | |

(Continued)

OTHER PUBLICATIONS

"Walmart and Google to offer voice-enabled shopping", BBC News, Aug. 23, 2017 (10 pages).

(Continued)

*Primary Examiner* — Zi Ye
(74) *Attorney, Agent, or Firm* — Foley & Lardner LLP; James De Vellis

(57) ABSTRACT

Serving a content item based on the acceptance of a new feature of an online product, includes sending a message to the client device indicating availability of a feature for the online product and requesting acceptance of the feature. An indication of acceptance of the feature is received and stored in a parameter. When a request for a content item is received, a content item is selected from a content item database based, at least in part, on the parameter.

20 Claims, 8 Drawing Sheets

(56) References Cited

U.S. PATENT DOCUMENTS

| | | | | |
|---|---|---|---|---|
| 2009/0171748 | A1* | 7/2009 | Aven | G06Q 30/02 |
| | | | | 705/14.54 |
| 2009/0265425 | A1* | 10/2009 | Lipscomb | G06Q 30/0601 |
| | | | | 709/203 |
| 2010/0057560 | A1 | 3/2010 | Skudlark et al. | |
| 2011/0125576 | A1 | 5/2011 | Song et al. | |
| 2011/0320250 | A1 | 12/2011 | Gemmell et al. | |
| 2017/0092278 | A1 | 3/2017 | Evermann et al. | |
| 2017/0110130 | A1 | 4/2017 | Sharifi et al. | |
| 2017/0110144 | A1 | 4/2017 | Sharifi et al. | |
| 2017/0132019 | A1 | 5/2017 | Karashchuk et al. | |
| 2017/0358301 | A1 | 12/2017 | Raitio et al. | |

OTHER PUBLICATIONS

Abrams, Help users find, interact & re-engage with your app on the Google Assistant, Google Developers Blog, Nov. 15, 2017, 16 pages.

Albrecht, "Alexa, How Can You Be Used in Restaurants?", the spoon, Dec. 10, 2017, 6 pages.

Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).

Barr, "AWS DeepLens—Get Hands-On Experience with Deep Learning With Our New Video Camera", AWS News Blog, Nov. 29, 2017, 11 pages.

Broussard, Mitchel, "Chatbot-Like Siri Patent Includes Intelligent Image, Video, and Audio Recognition within Messages", MacRumors, May 11, 2017 (7 pages).

Buckland et al., "Amazon's Alexa Takes Open-Source Route to Beat Google Into Cars", Bloomberg, Feb. 27, 2018, 6 pages.

Chen, Lulu Yilun, "Alibaba Challenges Google, Amazon With New Echo-Like Device", Bloomberg Technology, Jul. 5, 2017 (3 pages).

Clover, Juli, "Amazon and Google Want to Turn Their Smart Home Speakers Into Telephone Replacements", MacRumors, Feb. 15, 2017 (5 pages).

Coberly, "Apple patent filing reveals potential whispering Siri functionality", Techspot, Dec. 14, 2017, 4 pages.

Collins, et al., "Can Twitter Save Itself?", cnet, Apr. 26, 2017, reprinted from https://www.cnet.com/news/twitter-q1-2017-earnings/ on Aug. 22, 2017 (2 pages).

Crist, Ry, "Logitech Harmony's Alexa Skill just got a whole lot better", cnet, Jul. 13, 2017 (2 pages).

Estes, "Amazon's Newest Gadget Is a Tablet That's Also an Echo", Gizmodo, Sep. 19, 2017, 3 pages.

Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.

Forrest, Conner, "Essential Home wants to be bridge between Amazon's Alexa, Apple's Siri, and Google Assistant", TechRepublic, May 31, 2017 (10 pages).

Foxx, Chris, "Apple reveals HomePod smart speaker", BBC News, Jun. 5, 2017 (6 pages).

Gebhart, Andrew, "Google Assistant is spreading, but it needs its own Echo Dot", cnet, May 20, 2017 (7 pages).

Gebhart, Andrew, "Google Home to the Amazon Echo: 'Anything you can do . . .'", cnet, May 18, 2017 (7 pages).

Gibbs, Samuel, "Your Facebook Messenger app is about to be filled with ads", The Guardian, Jul. 12, 2017 (3 pages).

Golgowski, Nina, "This Burger King Ad Is Trying to Control Your Google Home Device", Huffpost, Apr. 12, 2017 (7 pages).

Google Developers, "GoogleAssistant Sdk" reprinted from https://developers.google.com/assistant/sdk/ on Aug. 22, 2017 (4 pages).

Google Inc., Products Feed Specification, printed from Internet address: http://www.support.google.com/merchants/bin/answer.py?hl=en&answer=188494#US, on Mar. 18, 2013, 6 pages.

Google Inc., Supported File Formats, printed from Internet address: http://www.support.google.com/merchants/bin/answer.py?hl=en&answer=160567, on Mar. 18, 2013, 1 page.

Gurman, et al., "Apple Is Manufacturing a Siri Speaker to Outdo Google and Amazon", Bloomberg, May 31, 2017 (5 pages).

Hardwick, Tim, "Facebook Smart Speaker Coming Next Year With 15-inch Touch Panel", MacRumors, Jul. 25, 2017 (5 pages).

Heater, "Amazon Alexa devices can finally tell voices apart", TechCrunch, Oct. 11, 2017, 6 pages.

Johnston, "Amazon Whirlwind: New Echo, Plus, Spot, Connect, Fire TV Take the Stage", Twice, Sep. 27, 2017, 4 pages.

Kelion, "Amazon revamps Echo smart speaker family", BBC News, Sep. 27, 2017, 11 pages.

Kelion, Leo, "Amazon's race to make Alexa smarter", BBC News, Jul. 28, 2017 (8 pages).

Koetsier, John, "Ads on Amazon Echo: Wendy's, ESPN, and Progressive Among Brands Testing", Forbes, May 11, 2017 (2 pages).

Krishna, "Jim Beam's smart decanter will pour you a shot when you ask", engadget, Nov. 29, 2017, 3 pages.

Lacy, "Improving search and advertising are the next frontiers for voice-activated devices", TechCrunch, Dec. 20, 2017, 13 pages.

Larson, Selena, "Google Home now recognizes your individual voice", CNN Money, San Francisco, California, Apr. 20, 2017 (3 pages).

Lee, Take Two for Samsung's troubled Bixby assistant', BBC News, Oct. 19, 2017, 6 pages.

Lee, Dave, "The five big announcements from Google I/O", BBC News, May 18, 2017 (9 pages).

Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.

Nieva, Richard, "Google Home and eBay can tell you how much that's worth", cnet, Mar. 8, 2017 (3 pages).

Novet, et al., "Amazon is getting ready to bring Alexa to work", CNBC, Nov. 29, 2017, 4 pages.

Palladino, "Garmin teamed up with Amazon to make a tiny Echo Dot for your car", ars Technica, Oct. 17, 2017, 2 pages.

Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).

Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).

Perez, "Alexa's 'Routines' will combine smart home control with other actions, like delivering your news and weather", TechCrunch, Sep. 28, 2017, 10 pages.

Perez, Sarah, "The first ad network for Alexa Skills shuts down following Amazon's policy changes", Tech Crunch, Jun. 15, 2017 (6 pages).

Porter, Jon, "Amazon Echo Show release date, price, news and features", Techradar, Jun. 26, 2017 (14 pages).

Pringle, "'I'm sorry to hear that': Why training Siri to be a therapist won't be easy", CBC News, Sep. 24, 2017, 3 pages.

Purcher, Jack, Today Google Home's Virtual Assistant can learn its Owner's voice for Security Reasons like Apple's Patent Pending Idea, Apr. 20, 2017, 4 pages.

Sablich, Justin, "Planning a Trip With the Help of Google Home", New York Times, May 31, 2017 (6 pages).

Seifert, Dan, "Samsung's new virtual assistant will make using your phone easier", The Verge, Mar. 20, 2017 (6 pages).

Sherr, Ian, "IBM built a voice assistant for cybersecurity", cnet, Feb. 13, 2017 (2 pages).

Siegal, Daniel, "IP Attys Load Up Apps' Legal Challenges at 'Silicon Beach'", Law360, Los Angeles, California, Feb. 2, 2017 (4 pages).

Unknown Author, "'Dolphin' attacks fool Amazon, Google voice assistants", BBC News, Sep. 7, 2017, 8 pages.

(56) References Cited

OTHER PUBLICATIONS

U.S. Notice of Allowance for U.S. Appl. No. 13/663,950 dated Jul. 29, 2016, 17 pages.
U.S. Office Action for U.S. Appl. No. 13/663,950 dated Apr. 6, 2016, 29 pages.
U.S. Office Action for U.S. Appl. No. 13/663,950 dated Aug. 5, 2015, 27 pages.
U.S. Office Action for U.S. Appl. No. 13/663,950 dated Jul. 23, 2014, 19 pages.
U.S. Office Action for U.S. Appl. No. 13/663,950 dated Mar. 25, 2015, 20 pages.
U.S. Office Action for U.S. Appl. No. 13/663,950 dated Nov. 4, 2014, 19 pages.
U.S. Office Action for U.S. Appl. No. 15/334,931 dated May 7, 2018, 57 pages.
Willens, Max, "For publishers, Amazon Alexa holds promise but not much money (yet)", Digiday, Jul. 6, 2017 (6 pages).
U.S. Final Office Action for U.S. Appl. No. 15/334,931 dated Dec. 11, 2018, 51 pages.

\* cited by examiner

SERVING A CONTENT ITEM BASED ON ACCEPTANCE OF A NEW FEATURE

CROSS-REFERENCE TO RELATED APPLICATIONS

This application claims the benefit of priority under 35 U.S.C. § 120 to U.S. patent application Ser. No. 15/334,931, filed on Oct. 26, 2016, titled "SERVING A CONTENT ITEM BASED ON ACCEPTANCE OF A NEW FEATURE," which claims the benefit of priority under 35 U.S.C. § 120 to U.S. patent application Ser. No. 13/663,950, filed on Oct. 30, 2012, titled "SERVING A CONTENT ITEM BASED ON ACCEPTANCE OF A NEW FEATURE," now U.S. Pat. No. 9,495,686, each of which is hereby incorporated by reference herein in its entirety.

BACKGROUND

The present disclosure relates generally to serving a content item to a user based on the user's acceptance of a new feature of an on-line product.

SUMMARY

In one implementation, in general, a computer-implemented method of serving a content item to a user based on acceptance of a feature of an online product is disclosed. The method includes using a server computer and a network interface device to provide the online product and make it accessible by a client device over a network. The online product may have a plurality of features. A server computer may send a message to the client device indicating availability of a feature of the online product and requesting acceptance of the feature. The server computer receives an indication of acceptance of the feature, which can be stored, included in a parameter stored in a memory device. A request for a content item to be served is fulfilled by selecting a content item from a content item database, based at least in part on the parameter, and serving the content item over the network.

In another implementation, in general, a system for serving a content item to a user based on acceptance of a feature of an online product includes a memory element and at least one processor interconnected with the memory element. The system is operable to, using a server computer and a network interface device, provide an online product to a client device over a network. The system sends, from the server computer, a message to the client device indicating availability of a feature for the online product and requesting acceptance of the feature. The system receives, at the server computer, an indication of acceptance of the feature. The received indication of acceptance is stored, using the memory element, in a parameter. The system may receive a request for a content item and can respond by selecting a content item from a content item database based, at least in part on the parameter, and serving the selected content item over the network.

In yet another implementation, in general, a computer-readable storage medium stores instructions executable by a processor to cause the processor to perform operations, which include the use of a server computer and a network interface device to provide an online product accessible by a client device over a network. The operations further include sending, from the server computer, a message to the client device indicating availability of a feature for the online product and requesting acceptance of the feature. The operations also include receiving, at the server computer, input indicating acceptance of the feature. The operations further include storing, using a memory element, a parameter indicating acceptance of the feature. The operations further include receiving a request for a content item to be served to the user, selecting a content item from a content item database based, at least in part, on the parameter, and serving the content item over the network.

BRIEF DESCRIPTION OF THE DRAWINGS

The details of one or more implementations of the subject matter described in this specification are set forth in the accompanying drawings and the description below. Other features, aspects, and advantages of the subject matter will become apparent from the description, the drawings, and the claims.

Like reference numbers and designations in the various drawings indicate like elements.

DETAILED DESCRIPTION

Third party content providers attempt to provide content items to online users. A content item may include, but is not limited to, articles, blog posts, newsfeeds, product-related information, advertisements, services, etc. In order to provide a content item, the third party content providers may use a variety of signals, such as interests of the user, activities of the user, geographical location of the user, etc.

A content item may also be provided based on the technology adoption of the user. For example, a third party content provider may decide to present a content item to a user based on the timing of when the user adopts technology. For example, a third party content provider may select content depending on whether the user is an early adopter of technology or a future adopter of technology. Typically, this is done by selecting content that is likely to attract early adopters. However, this requires some manual determination of products that are associated with early adopters and is not as automated of a selection process.

The systems, methods and devices described herein may be used to identify a user's technology adoption or acceptance level. The technology adoption level may be used to provide a content item to the user.

Figure 1:
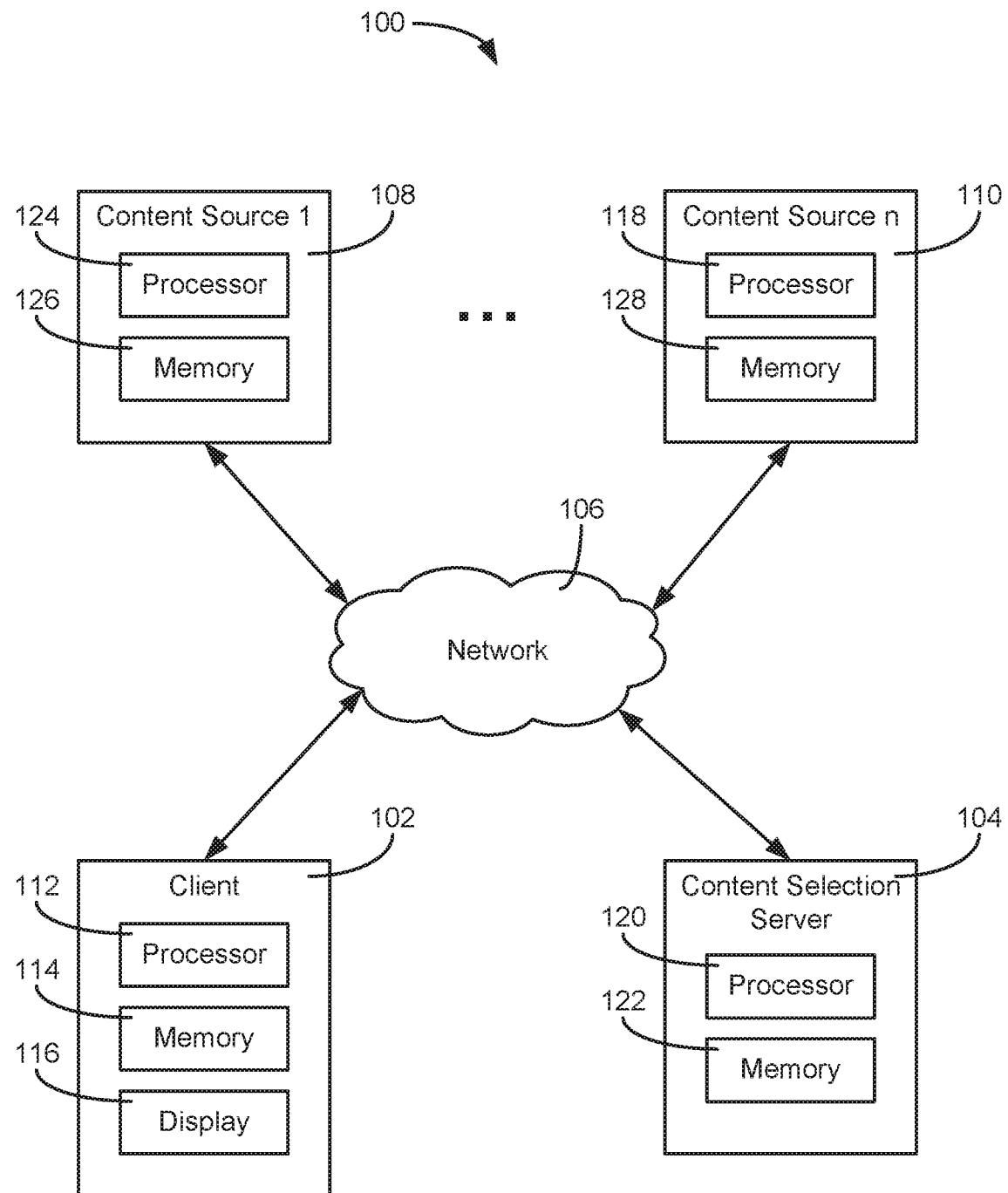
FIG. 1 is an example of a block diagram of a computer system in accordance with a described implementation.

FIG. 1 is a block diagram of a computer system 100 in accordance with a described implementation. System 100 includes client 102, which may communicate with other computing devices via a network 106. For example, client 102 may communicate with one or more content sources ranging from a first content source 108 up to an nth content source 110. Content sources 108, 110 may provide webpages and/or media content (e.g., audio, video, and other forms of digital content) to clients client 102. System 100 may include a content selection server 104, which provides advertisement data to other computing devices over network 106.

Network 106 may be any form of computer network that relays information between client 102, content selection server 104, and content sources 108, 110. For example, network 106 may include the Internet and/or other types of data networks, such as a local area network (LAN), a wide area network (WAN), a cellular network, satellite network, or other types of data networks. Network 106 may include any number of computing devices (e.g., computer, servers, routers, network switches, etc.) that are configured to receive and/or transmit data within network 106. Network 106 may include any number of hardwired and/or wireless connections. For example, client 102 may communicate wirelessly (e.g., via WiFi, cellular, radio, etc.) with a transceiver that is hardwired (e.g., via a fiber optic cable, a CAT5 cable, etc.) to other computing devices in network 106.

Client 102 may be any number of different user electronic devices configured to communicate via network 106 (e.g., a laptop computer, a desktop computer, a tablet computer, a smartphone, a digital video recorder, a set-top box for a television, a video game console, etc.). Client 102 is shown to include a processor 112 and a memory 114, i.e., a processing circuit. Memory 114 stores machine instructions that, when executed by processor 112, cause processor 112 to perform one or more of the operations described herein. Processor 112 may include a microprocessor, application-specific integrated circuit (ASIC), field-programmable gate array (FPGA), etc., or combinations thereof. Memory 114 may include, but is not limited to, electronic, optical, magnetic, or any other storage or transmission device capable of providing processor 112 with program instructions. Memory 114 may include a floppy disk, CD-ROM, DVD, magnetic disk, memory chip, ASIC, FPGA, read-only memory (ROM), random-access memory (RAM), electrically-erasable ROM (EEPROM), erasable-programmable ROM (EPROM), flash memory, optical media, or any other suitable memory from which processor 112 can read instructions. The instructions may include code from any suitable computer-programming language such as, but not limited to, C, C++, C#, Java, JavaScript, Perl, and Python.

Client 102 may include one or more user interface devices. In general, a user interface device refers to any electronic device that conveys data to a user by generating sensory information (e.g., a visualization on a display, one or more sounds, etc.) and/or converts received sensory information from a user into electronic signals (e.g., a keyboard, a mouse, a pointing device, a touch screen display, a microphone, etc.). The one or more user interface devices may be internal to a housing of client 102 (e.g., a built-in display, microphone, etc.) or external to the housing of client 102 (e.g., a monitor connected to client 102, a speaker connected to client 102, etc.), according to various implementations. For example, client 102 may include an electronic display 116, which visually displays webpages using webpage data received from content sources 108, 110 and/or from content selection server 104.

Content sources 108, 110 are electronic devices connected to network 106 and provide media content to client 102. For example, content sources 108, 110 may be computer servers (e.g., FTP servers, file sharing servers, web servers, etc.) or other devices that include a processing circuit. Media content may include, but is not limited to, webpage data, a movie, a sound file, pictures, and other forms of data. Similarly, content selection server 104 may include a processing circuit including a processor 120 and a memory 122. In some implementations, content selection server 104 may include several computing devices (e.g., a data center, a network of servers, etc.). In such a case, the various devices of content selection server 104 may comprise a processing circuit (e.g., processor 120 represents the collective processors of the devices and memory 122 represents the collective memories of the devices).

Content selection server 104 may provide digital advertisements to client 102 via network 106. For example, content source 108 may provide a webpage to client 102, in response to receiving a request for a webpage from client 102. In some implementations, an advertisement from content selection server 104 may be provided to client 102 indirectly. For example, content source 108 may receive advertisement data from content selection server 104 and use the advertisement as part of the webpage data provided to client 102. In other implementations, an advertisement from content selection server 104 may be provided to client 102 directly. For example, content source 108 may provide webpage data to client 102 that includes a command to retrieve an advertisement from content selection server 104. On receipt of the webpage data, client 102 may retrieve an advertisement from content selection server 104 based on the command and display the advertisement when the webpage is rendered on display 116.

According to various implementations, a user of client 102 may search for, access, etc. various documents (e.g., web pages, web sites, articles, images, video, etc.) using a search engine via network 106. The documents may be displayed as a search result from a search engine query containing search terms or keywords. Search engine queries may allow the user to enter a search term or keyword into the search engine to execute a document search. Search engines may be stored in memory 122 of server 104 and may be accessible with client 102. The result of an executed website search on a search engine may include a display on a search engine document of links to websites. Executed search engine queries may result in the display of advertising data generated and transmitted from server 104. In some cases, search engines contract with advertisers to display advertising to users of the search engine in response to certain search engine queries.

In some implementations, the device identifier is associated with a particular instance of a client application (e.g., running on client device 102). In some implementations, the device identifier is associated with a user (e.g., when the user logs in with a username and password). Some information that may be associated with the user may include events, such as one or more queries, one or more clicks, browser history data (e.g., the URLs visited, the number of URLs viewed, URL visit durations, etc.), etc. Events may also include advertising metrics, such as impressions, click through rate, etc. for each user. For example, the device identifier may include a time stamp associated with a particular event. Events may also include how many times a user is exposed to a particular ad, a campaign, etc.

Content source 108, 110 may select content to be provided with a webpage based on the device identifier for a user visiting the document.

For example, a user may select to receive content items from a content selection server. Rather than selecting content to be provided on the web page based on the content of the web page itself or on other factors, content selection server 104 may take into account the device identifier provided as part of the content request. In one example, a user may visit a number of webpages devoted to reviews of golf clubs and later visit a webpage to check stock quotes. Based on the user's visits to the golf-related webpages, the user may be determined to be interested in receiving contents for golf clubs. When the user later visits the webpage to check stock quotes, an online retailer of golf equipment may seek to include an content on the webpage for that particular user, even though the financial webpage is unrelated to golf.

If content is selected based in part on a device identifier for a user that selects to receive more a content item, a content provider may specify that certain content is to be provided to a set of device identifiers. For example, a content provider may identify a set of device identifiers associated with visiting the content provider's website and making a purchase. Such users may later wish to know if the content provider is running a sale. In some cases, an advertising network may identify users on behalf of the content provider that may be interested in receiving contents from the content provider. For example, content providers may specify a number of topic categories for their contents and the advertising network may match users' interests to the categories, to provide content items to the users.

Figure 2:
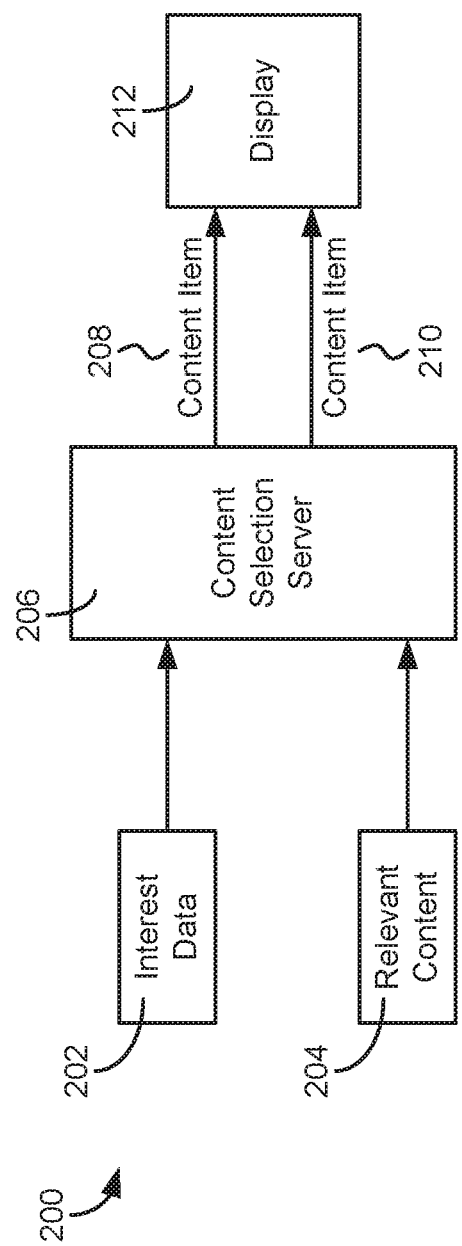
FIG. 2 is an illustration of an example system for serving a content item in accordance with a described implementation.

Referring now to FIG. 2, and in brief overview, an example system 200 for serving a content item is shown in which a content selection server 206 accesses interest data 202 and relevant content 204 to select content items 208, 210 for display 212 at an interface.

Still referring to FIG. 2, and in more detail, interest data 202 may be received from a number of different sources. For example, interest data 202 may be stored and retrieved from a social network. The social network may host information about social network users and information generated by the social network users.

Interest data may include data retrieved from the user's profile, browser history data, etc. The interest data may include interests, stories, facts, descriptions, etc. that relate to the user. Interest data may also indicate relationships with other users, such as professional connections or "friends." Interest data may also include user-generated content such as user blogs, postings by the user, postings by other users connected to the user, or interests which the user has decided to make publicly-available.

Interest data 202 may be associated (matched) with a user identifier in order to provide content items 208, 210 to the user. In some implementations, the interest data may be stored separately from the user identifier.

A content network may select a content item 204 to be provided with a webpage based on a user identifier for a user visiting the webpage. For example, a user may select to receive content items 208, 210 from content selection server 104. Rather than selecting an advertisement to be provided on a webpage based on the content of the webpage itself or on other factors, content selection server 104 may take into account a user identifier sent as part of a content request.

In one example, a user may visit a number of webpages devoted to reviews of golf clubs and later visit a webpage to check stock quotes. Based on the user's visits to the golf-related webpages, the user may be determined to be interested in receiving advertisements for golf clubs. When the user later visits the webpage to check stock quotes, an online retailer of golf equipment may seek to include an advertisement on the webpage for that particular user, even though the financial webpage is unrelated to golf.

For situations in which the systems discussed here collect information about users, or may make use of information about users, the users may be provided with an opportunity to control whether programs or features may collect user information (e.g., information about a user's social network, social actions or activities, a user's preferences, or a user's current location), or to control whether and/or how to receive content from the content server that may be more relevant to the user. In addition, certain data may be treated in one or more ways before it is stored or used, so that certain information is removed when generating parameters (e.g., demographic parameters). For example, a user's identity may be treated so that no identifying information can be determined for the user, or a user's geographic location may be generalized where location information is obtained (such as to a city, ZIP code, or state level), so that a particular location of a user cannot be determined. Thus, users may have control over how much information is collected about them and used by a content server.

If content is selected based in part on a user identifier for a user that selects to receive content items 208, 210, a content provider may specify that certain content is to be provided to a set of user identifiers. For example, an advertiser may identify a set of user identifiers associated with visiting the advertiser's website and making a purchase. Such users may later wish to know if the advertiser is running a sale. In some cases, an advertising network may identify users on behalf of the advertiser that may be interested in receiving advertisements from the advertiser. For example, advertisers may specify a number of topic categories for their advertisements and the advertising network may match users' interests to the categories, to provide relevant advertisements to the users.

A similar user identifier may be determined by a content network based on a first set of one or more user identifiers. User characteristics such as browsing histories, demographics, etc. may be used to identify one or more similar user identifiers to those of a specified set. For example, assume that a set of users specified by an advertiser purchased airline tickets to Australia after viewing webpages devoted to the Great Barrier Reef. In such a case, a user visiting a webpage devoted to the Great Barrier Reef may be a strong indicator that the user may be interested in purchasing an airline ticket to Australia. Thus, browsing histories (e.g., webpages and/or websites visited by a user, content requested by a user, etc.) associated with the users' identifiers may be analyzed to determine similar user identifiers that were also used to visit webpages devoted to the Great Barrier Reef. When such user identifier is used to visit a webpage that participates in the advertising network, an advertisement for airline tickets to Australia may be displayed with the webpage. In this way, an advertising network may generate a set of one or more similar user identifiers that share characteristics with user identifiers specified by the advertiser.

In some cases, multiple parties may wish to provide content to a particular user identifier. For example, assume that a user identifier has been identified by two different advertisers as belonging to a user that potentially is interested in their respective products. In one implementation, advertisers or other content providers may compete in an online auction for the ability to provide content to a particular user identifier. For example, an auction server may conduct such an advertisement auction to select which advertisement is to be provided as part of a webpage visited using a particular user identifier. An advertisement from the advertiser having the highest bid in the auction may then be provided to a device associated with the user identifier and displayed with the webpage.

Content selection server 104 via a content delivery system may serve content items 208, 210 on display 212. Content items 208, 210 may be displayed on a user device when a content item 204 is displayed. The user device may control which content item 208, 210 is displayed. For example, if the user selected personalization, then the personalized content item may be displayed. In some implementations, the non-personalized content item may be displayed, if the user chooses to display the non-personalized content item.

Figure 3:
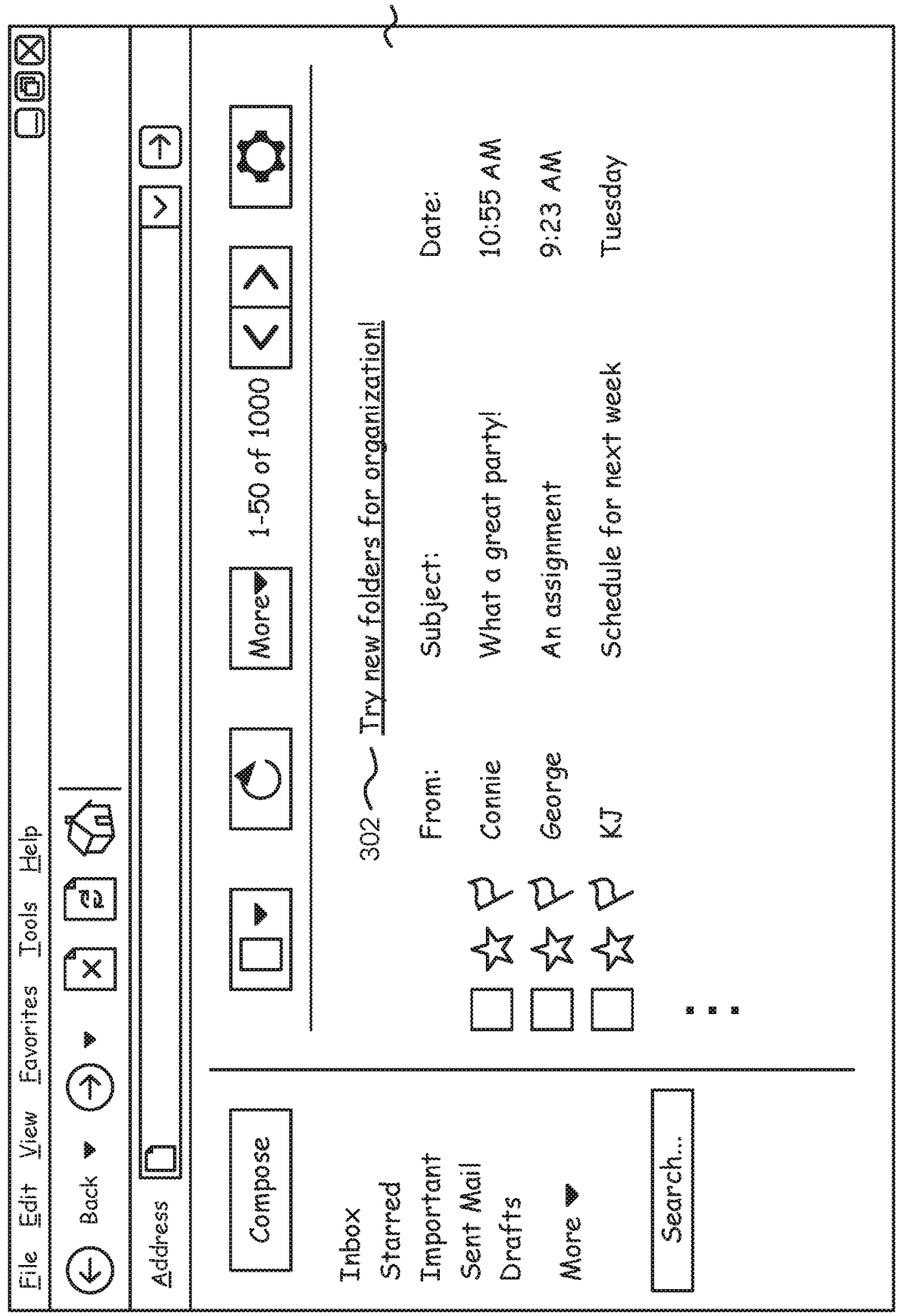
FIG. 3 is an illustration of an example of a resource with an application in accordance with a described implementation.
Figure 4:
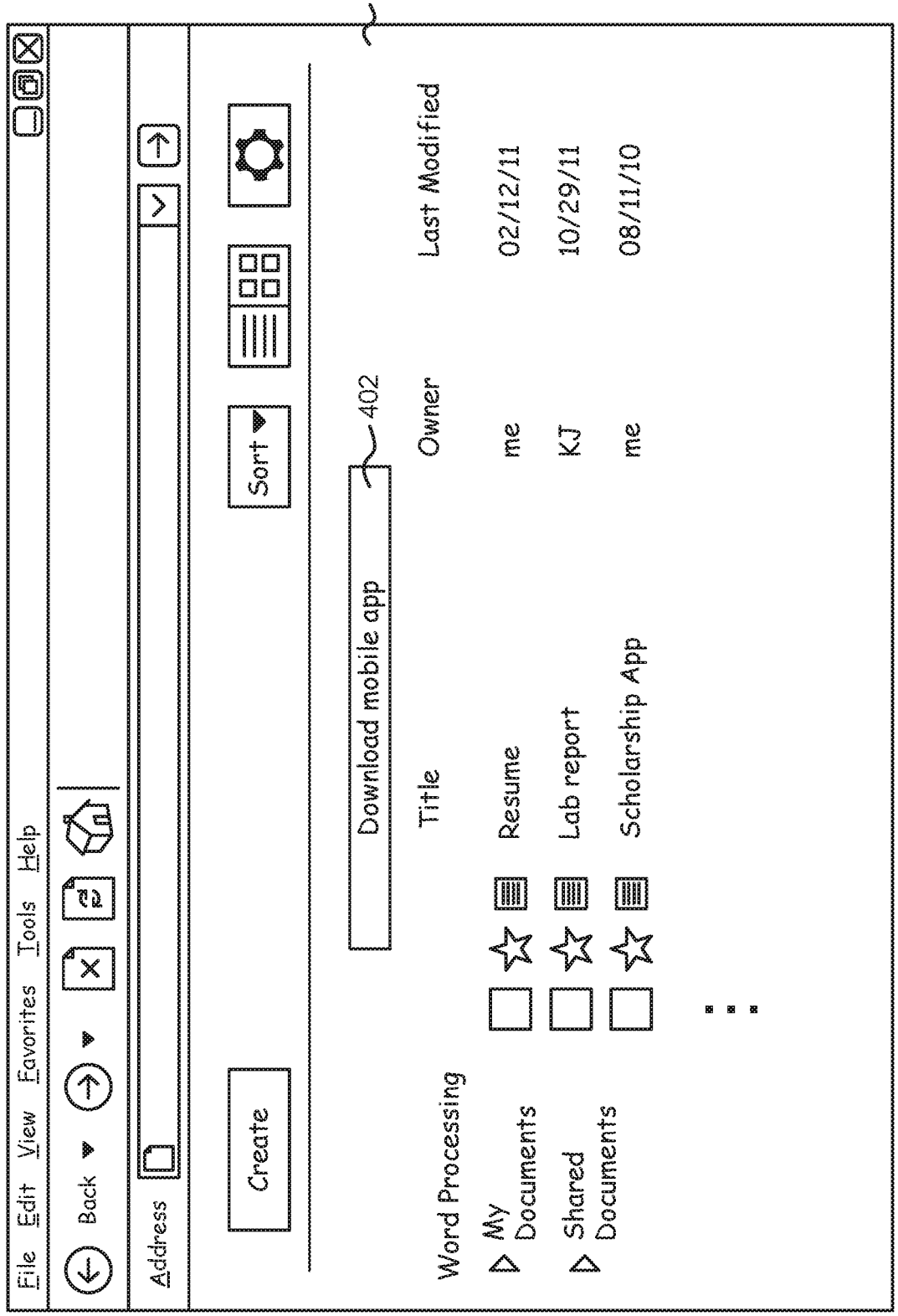
FIG. 4 is an illustration of an example of a resource with another application in accordance with a described implementation.

FIGS. 3 and 4 illustrate an example resource, in accordance with a described implementation. As illustrated by FIGS. 3 and 4, example resource 300, 400 is a website. Example resource 300, 400 may include application 310, 410. As shown in FIGS. 3 and 4, application 310, 420 is an online product. Application 310, 420 will be referred to throughout either as an "online product" or as a "application." Application 310, 410 may be any number of online applications, such as, for example, email application, geographical application, word processing application, a search engine, a web browser, a social network, an operating system, etc. Application 310, 410 may include a user account profile for the user that accesses application 310, 410. Linked to the user account profile, the user may also have an email account, a word processing account, a blogging account, and so forth that are related to application 310, 410.

As shown in FIG. 3, application 310 is depicted as an email application. As shown in FIG. 4, application 410 is depicted as a word processing application. Application 310, 410 may be periodically updated with new features. For example, application 310, 410 may include features such as labels, filters, social sharing, etc.

The introduction of new features may occur consistently within the applications of a web provider. For example, an alert bar 302, 402 at the top of the browser window, illustrated in both FIGS. 3 and 4, may be shown to the user. As shown in FIG. 3, application 310 displays an option (302) to update the application with a new feature related to folders. As shown in FIG. 4, application 410 displays an option (402) to download a mobile version of application 410.

Figure 5:
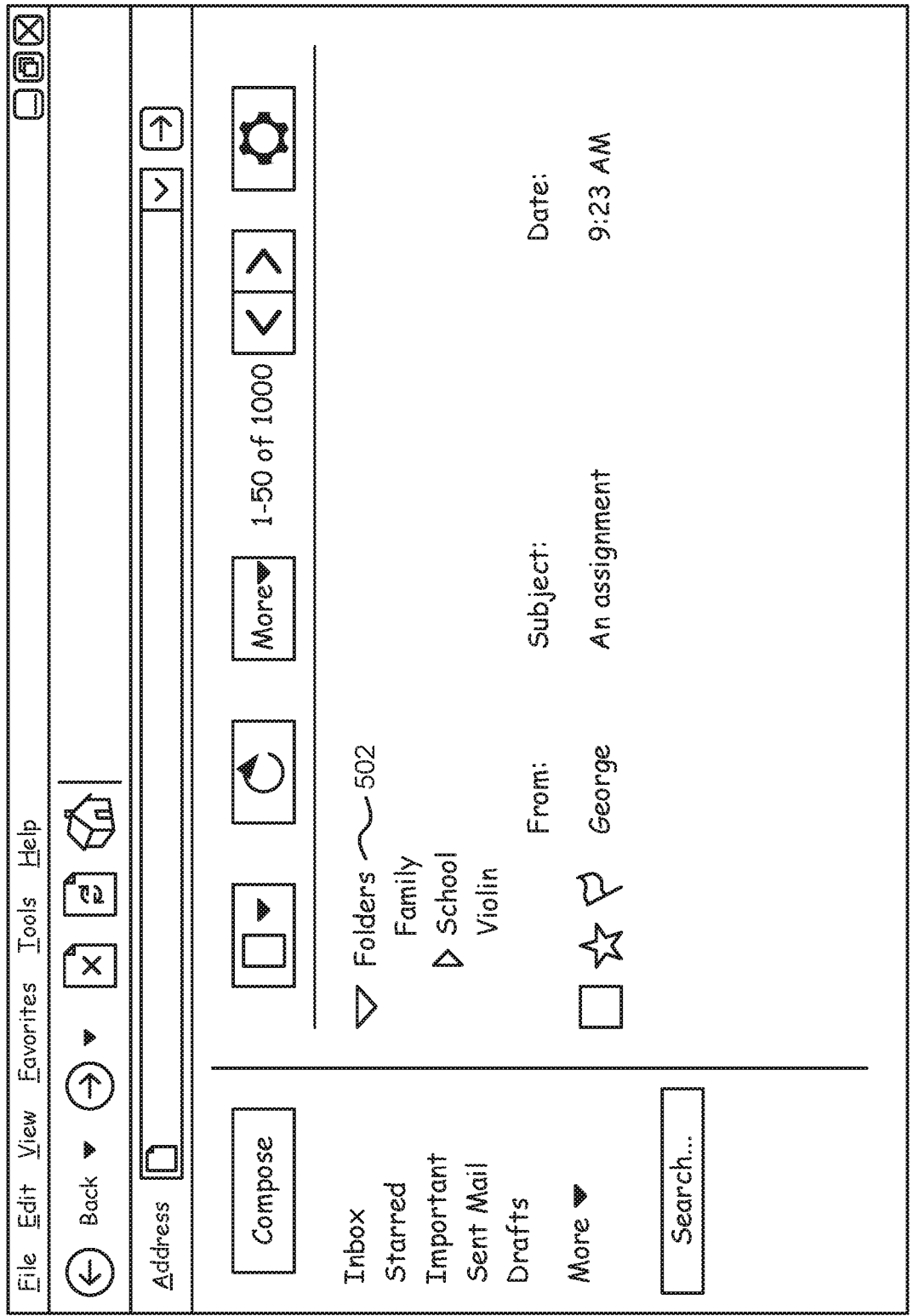
FIG. 5 is an illustration of an updated application, the application as illustrated in FIG. 3, in accordance with a described implementation.
Figure 6:
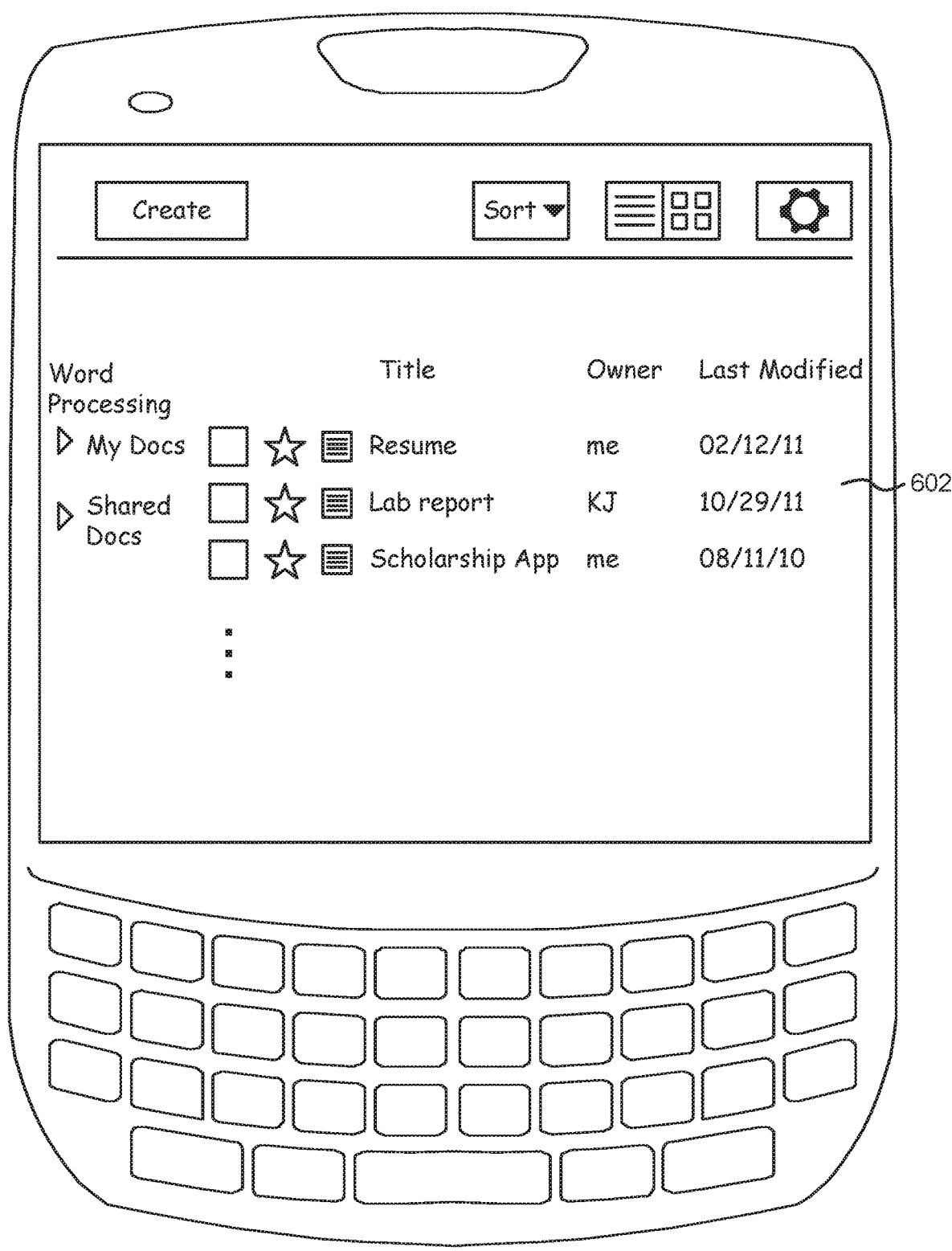
FIG. 6 is an illustration of an updated application, the application as illustrated in FIG. 4, in accordance with a described implementation.

FIGS. 5 and 6 illustrate the updated applications with the new features that have been adopted by the user, in accordance with a described implementation. In FIGS. 5 and 6, the alert bar at the top of the browser window displays the new feature that was added to the respective application. For example, in FIG. 5, the option to update the application with folders is selected and the email application is now displayed to the user with the folders feature (502). Similarly, in FIG. 6, the option to download the word processing application on the mobile device of the user is selected and the word processing application is now displayed on the mobile device of the user (602).

The new feature in application 310, 410 may be adopted by the user within different time frames. For example, one user may adopt the feature within one week of the feature's release. In this example, the user may be characterized as an early adopter. Another user may adopt the feature within ten weeks of the feature's release. This user may be characterized as a late adopter.

In FIGS. 5 and 6, for example, the user may begin using the respective features 502, 602, or a combination of features, very early as compared to the rest of the users of the email application 310 or the word processing application 410. The user account profile may be labeled with an adoption score that reflects the timing of the adoption of the feature.

The adoption score is a parameter based on the user's acceptance of the new feature of the online product. The adoption score is a dynamic score such that it can change over time. In some implementations, an inertia factor is applied to the adoption score to ensure that the adoption score is protected against extremes when the adoption score is used to provide a content item to the user. A new user may be assigned an initial adoption score based on the adoption scores of users connected to the new user, such as in a social network.

The features for each application that are linked to the user account profile and labeled with the adoption score may be selected in a number of ways. In one example, the application provider may manually select the features or the scope of the features that determine the adoption score, which is used to provide a content item to the user.

In another example, the features or the scope of the features may be automatically selected to provide a content item to the user. In this example, the adoption of each new feature is monitored over a period of time along an adoption curve. The adoption curve is the number of users or the percentage of users that have adopted the feature vs. the period of time. A determination is made as to whether the feature's adoption curve indicates a reasonable distribution of adoption of the feature vs. the period of time, meaning distinct user segments may be created with a proper confidence level.

If the feature's adoption curve has a reasonable distribution, then the feature is a candidate for using the adoption score to provide a content item to the user. Given two features, for example, feature A and feature B, feature A is a good candidate based on its adoption curve that shows 20% of users adopt the feature within one week, 30% of users adopt the feature within two weeks, 30% of users adopt the feature within four weeks, 10% of users adopt the feature within five weeks, and 10% of users never adopt the feature. Feature B is a weak candidate based on its adoption curve that shows 80% of users adopt the feature in the first week, 10% of users adopt the feature within two weeks, and 10% of users never adopt the feature.

The automatic selection of features may also include a reliance on stable early adopters. Stable early adopters are users that continuously have high adoption scores, based on adopting the features at an early time. The time when these users adopt a new feature may indicate the expected adoption time for other users.

Figure 7:
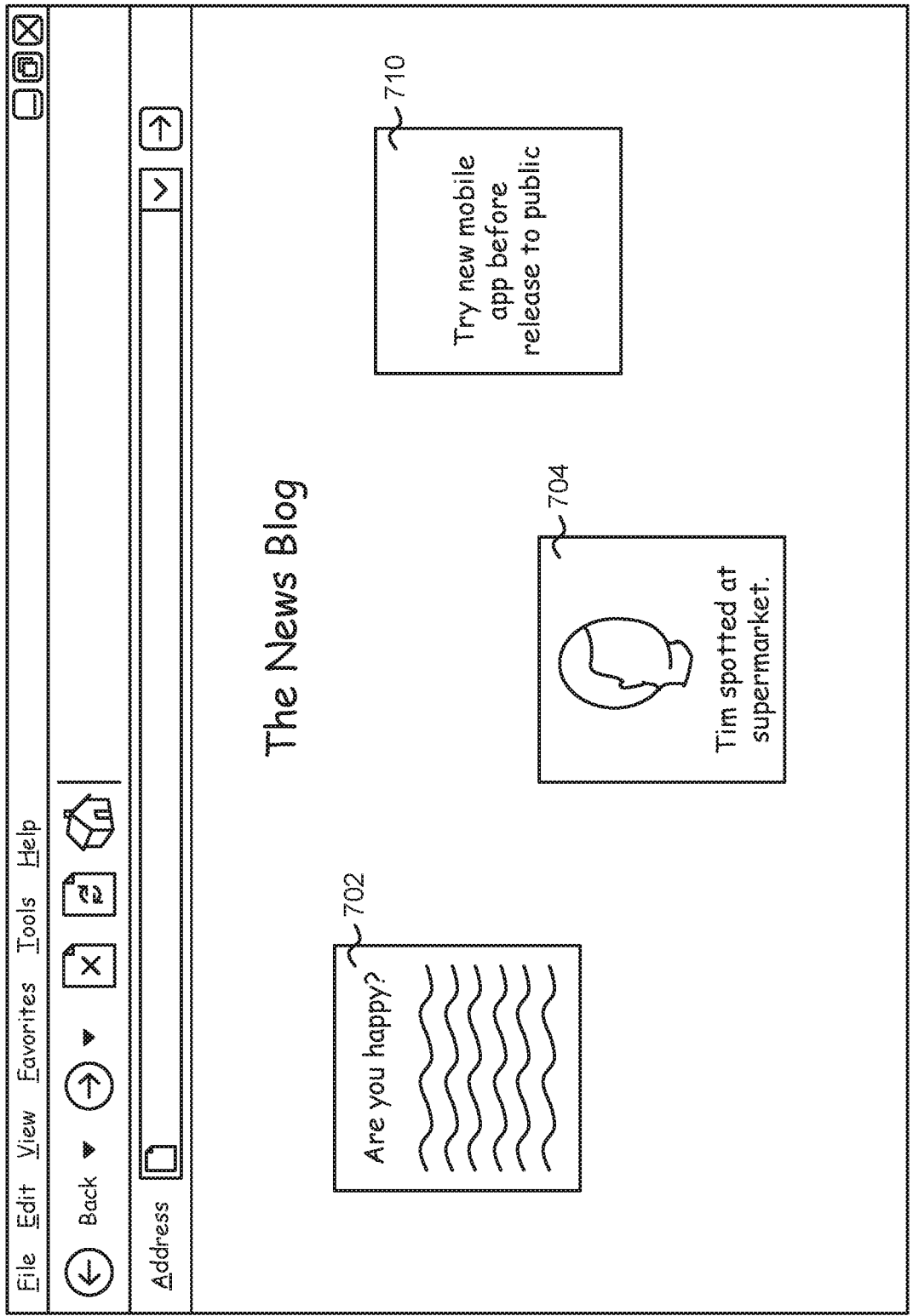
FIG. 7 is an illustration of a content item displayed to a user based on an adoption score of a user, in accordance with a described implementation.

FIG. 7 is an illustration of a content item being provided to the user based on the adoption score, in accordance with a described implementation. Example resource 700, shown as a website, is displayed to a user, which includes content item 710. Content item 710 may be provided to the user based on the adoption score and on campaign parameters determined by a third party content provider. For example, the third party content provider may set up a campaign for a new mobile phone (content item 710), where the target research has shown that the new mobile phone will only be successful among early adopters. In another example, the third party content provider may set up a campaign to limit content item 710 to be shown to users that have an adoption score above a specified limit.

Adoption scores may be provided to the third party content provider on a scale. In one implementation, the scale may include (from earliest to latest adopters): trendsetter, early adopter, early majority, majority, late majority, and late adopter. For example, trendsetter may be a user that adopts the feature as soon as the feature is released. Early majority may be a user that adopts the feature as soon as a threshold of users adopt the feature, for example, once 10% of all users have adopted the feature.

Content optimization may be used prior to providing content item 710 to the user. In an implementation, content items may be provided equally to users with various adoption scores. The content item is analyzed to determine which group of users, based on adoption score, engaged (e.g., moused over, clicked through, converted, etc.) with the content item. The analysis of the content item may be stored and retrieved to provide a content item to the group of users that had the highest level of engagement.

Content optimization may further include a built-in delay in by providing the content item of the third party content provider's campaign to late adopters. In one implementation, if the campaign is set to run for several months, then during the first month, the content item may be provided to the early adopters, and then during the second month, the content item may be provided to the late adopters.

As shown in FIG. 7, content item 710 includes a message based on the adoption score of the user. In FIG. 7, the user viewing the content item has been determined to be an early adopter and therefore, is presented with content item 710, which includes the message "try new mobile app before release to public." If the user is a late adopter, then, content item 710 may be presented with the message, "already 20,000 happy users of the mobile app and counting!"

In another implementation, content item 710 may be provided based on publicity related to content from additional online sources. When the publicity related to the content is increasing (measured, for example, by total number of occurrences), the content item may be provided to the early adopters. When the publicity related to the content is decreasing, then the content item may be provided to the late adopters.

Figure 8:
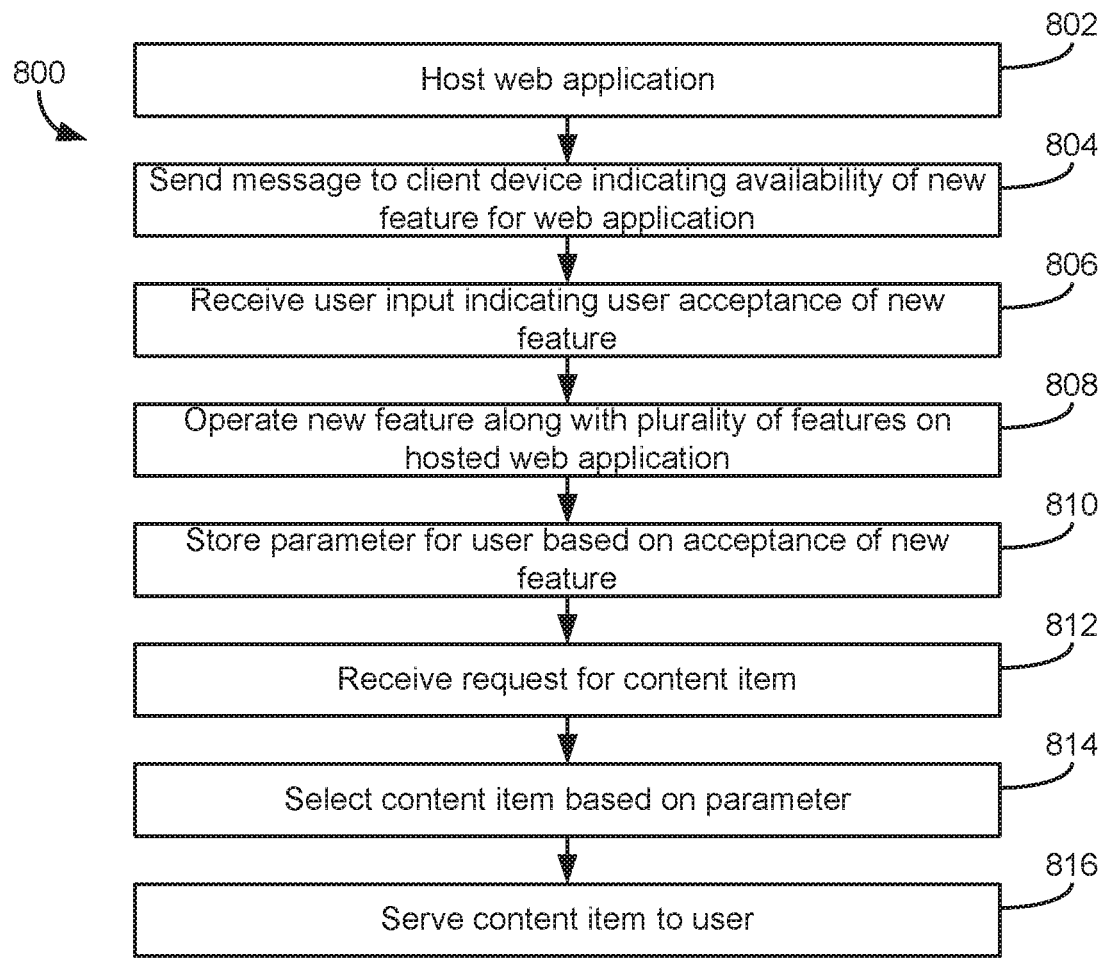
FIG. 8 is a flow diagram of a method for serving a content item to a user based on the user's acceptance of a new feature of an on-line product, in accordance with a described implementation.

FIG. 8 is an example of a flow diagram of a method 800 for serving a content item to a user based on the user's acceptance of a new feature of an on-line product. Example method 800 may be implemented by various combinations of systems. Example 800 may be performed online or offline.

Example method 800 may begin at block 802, a server computer and a network interface device may be used to host a application. The application may be accessible by the user at a client device over a network. The application may include a plurality of features.

At block 804, a message may be sent from the server computer to the client device. The message may indicate the availability of a new feature for the application. The message may also request user acceptance of the new feature.

At block 806, user input indicating user acceptance of the new feature may be received at the server computer. In some implementations, the sending step (block 804) and the receiving step (block 806) may be repeated for additional new features for the application and to calculate a parameter based on whether the user accepted the new feature and the additional new features. The parameter may be calculated based at least in part on acceptance of the new feature by a plurality of other users. The calculated parameter may be filtered to weigh at least some acceptances differently than at least some other acceptances when calculating the parameter. In some implementations, the parameter may be configurable to have at least three different values.

At block 808, the new feature is operated along with the plurality of features on the hosted application. At block 810, the parameter for the user based on the acceptance of the new feature is stored in a user profile, which is stored in a memory device. In some implementations, an identifier is retrieved from the user profile. The identifier may include a plurality of additional users having a stored relationship to the user. Each of the additional users may have parameters in their respective user profiles that may be calculated based on acceptance of new features of products by those users. The initial value of the parameter based on the parameters of the additional users may be stored. The initial value of the parameter may be updated based on the acceptance of the new feature.

At block 812, a request for a content item to be served to the user is received. The request for the content item may be received by a server. The request for the content item may be provided by the server, a client device, etc. Content items may be directly (or indirectly) entered, maintained, monitored, etc. by one or more content sources, such as advertisers. The content items may be stored in the content selection server, a database, a memory, etc. The content items may be graphical, textual, images, audio, video, a combination of these formats, or any other type of electronic content item. The content items may also include embedded information, such as links, metadata, machine-executable instructions (HTML, JavaScript, etc.), etc.

At block 814, a content item is selected from a content item database based at least in part on the parameter. The content item may be selected from the content selection server based at least in part on the parameter. For example, the content selection server may identify a relevant content item that has been stored based on the parameter. The content selection server may select the content item based upon the expectation that the content item will result in more revenue due to a higher response rate and provide a better experience for the user.

At block 816, the content item is served to the user over the network. The content item may be displayed to the user on a document, such as a web page, alongside other content on the web page, on search results, e.g., alongside search results, or another appropriate placement.

In some implementations, method 800 may include receiving an adoption selection from a content provider of the content item through a content provider account. The content item may be selected based on the adoption selection received from the content provider.

In another implementation, method 800 may include hosting a second application. The second application may be different than the application. For example, the application may be an email application and the second application may be a word processing application. In this example, the server computer may be configured to store a single account username and password for both the email application and the word processing application. The second application may also be accessible by the user at the client device over the network. In some implementations, the second application includes a second plurality of features.

The method may further include sending a message to the client device. The message may indicate availability of a new feature for the second application. The message may also request user acceptance of the new feature. The method may also include receiving user input indicating user acceptance of the new feature for the second application. The method may yet further include updating the parameter for the user based on the acceptance of the new feature for the second application and selecting the content item from the content item database based at least in part on the updated parameter.

Implementations of the subject matter and the functional operations described in this specification can be implemented in other types of digital electronic circuitry, or in computer software, firmware, or hardware, including the structures disclosed in this specification and their structural equivalents, or in combinations of one or more of them.

Implementations of the subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, i.e., one or more modules of computer program instructions, encoded on one or more computer storage media for execution by, or to control the operation of, data processing apparatus. Alternatively or in addition, the program instructions can be encoded on an artificially-generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate components or media (e.g., multiple CDs, disks, or other storage devices). Accordingly, the computer storage medium is tangible.

The operations described in this specification can be performed by a data processing apparatus on data stored on one or more computer-readable storage devices or received from other sources.

The term "data processing apparatus" or "computing device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system to select content items based on adoption of features to applications in computer networked environments, comprising:
   a data processing system having one or more processors and memory, to:
   provide a first audio content item to a first client device and to a second client device, the first audio content item indicating an availability of a feature of an application, the feature of the application available since a launch time;
   receive, from the first client device, at a first time, a first response indicating an acoustic acceptance of the feature of the application by the first client device;
   receive, from the second client device, at a second time subsequent to the first time, a second response indicating an acoustic acceptance of the feature of the application by the second client device;
   determine, for the first client device, a first adoption score based on a function of a first time period elapsed between the first time corresponding to receipt of the first response and the launch time of the feature of the application and an inertia factor, the inertia factor to constrain adoption scores to a predefined range;
   determine, for the second client device, a second adoption score based on the function of a second time period elapsed between the second time corresponding to receipt of the second response and the launch time of the feature of the application and the inertia factor, the second time period greater than the first time period;
   identify the first client device as an early adopter based on the first adoption score for the first client device;
   identify the second client device as a late adopter based on the second adoption score for the second client device;
   select, for the first client device, a second audio content item based on the identification of the first client device and the first response indicating the acoustic acceptance of the feature of the application by the first client device;
   select, for the second client device, one of the second audio content item and a third audio content item based on the identification of the second client device and the second response indicating the acoustic acceptance of the feature of the application by the second client device;
   provide the second audio content item to the first client device based on the identification of the first client device; and
   provide, at a time subsequent to the provision of the second audio content item to the first client device, one of the second audio content item and the third audio content item to the second client device based on the identification of the second client device.

2. The system of claim 1, comprising the data processing system to:
   provide the first audio content item to the first client device to cause the first client device to playback the first audio content item indicating the availability of the feature of the application; and
   provide the second audio content item to the second client device to cause the second client device to playback the first second audio content item indicating the availability of the feature of the application.

3. The system of claim 1, comprising the data processing system to:
   receive, from the first client device, at the first time, the first response indicating the acoustic acceptance of the feature of the application by the first client device, the acoustic acceptance corresponding to a speech feedback detected at the first client device; and
   receive, from the second client device, at the second time subsequent to the first time, the second response indicating the acoustic acceptance of the feature of the application by the second client device, the acoustic acceptance corresponding to a speech feedback detected at the second client device.

4. The system of claim 1, comprising the data processing system to:
   provide, at a third time subsequent to providing the second audio content item, a fourth audio content item to the first client device, the fourth audio content item indicating an availability of a second feature to the application;
   receive, from the first client device at a fourth time subsequent to the second time, a second response indicating an acoustic acceptance of the second feature by the first client device;
   update the first adoption score for the first client device based on the function of a time elapsed between the third time and the fourth time and the inertia factor; and
   identify the first client device as one of the early adopter and the late adopter based on the first adoption score.

5. The system of claim 1, comprising the data processing system to:
   provide, at a third time subsequent to providing the second audio content item, a fourth audio content item to the first client device, the fourth audio content item indicating an availability of a second feature to the application;
   receive, from the first client device at a fourth time, a second response indicating an acoustic acceptance of the second feature by the first client device;
   determine a third adoption score for the first client device based on a time elapsed between the third time and the fourth time;
   identify the first client device as the early adopter based on the third adoption score; and determine an expected adoption time for a third client device based on the third adoption score and the identification of the first client device as the early adopter.

6. The system of claim 1, comprising the data processing system to:
determine the first adoption score for the first client device based on the function of the first time period and a first weight;
provide, at a fourth time, a fourth content item to the first client device, the fourth content item indicating an availability of a second feature to the application;
receive, from the first client device at a fifth time subsequent to the fourth time, a second response indicating an acoustic acceptance of the second feature by the first client device;
update the first adoption score for the first client device based on a third time period between the fourth time and the fifth time by a second weight different from the first weight; and
identify the first client device as one of the early adopter and the late adopter based on the first adoption score.

7. The system of claim 1, comprising the data processing system to:
determine a distribution of an adoption of the feature from the first adoption score and the second adoption score;
determine that a percentage of early adoption for the feature is less than a threshold based on the distribution of the adoption of the feature; and
select the second audio content item, responsive to the determination that the percentage of early adoption for the feature is less than the threshold.

8. The system of claim 1, comprising the data processing system to:
determine that the first adoption score for the first client device is within a range of adoption scores associated with early adoption of the feature;
identify the first client device as the early adopter, responsive to the determination that the first adoption score is within the range of adoption scores associated with the early adoption;
determine that the second adoption score for the second client device is within a range of adoption scores associated with late adoption of the feature; and
identify the second client device as the late adopter, responsive to the determination that the second adoption score is within the range of adoption scores associated with the late adoption.

9. The system of claim 1, comprising the data processing system to:
determine that the first adoption score for the first client device is within a range of adoption scores associated with early adoption of the feature;
identify the first client device as the early adopter, responsive to the determination that the first adoption score is within the range of adoption scores associated with the early adoption;
determine that the second adoption score for the second client device is within a range of adoption scores associated with late adoption of the feature; and
identify the second client device as the late adopter, responsive to the determination that the second adoption score is within the range of adoption scores associated with the late adoption.

10. The system of claim 1, comprising the data processing system to:
store, in a first account profile on the memory, a first parameter indicating the acoustic acceptance of the feature by the first client device and including the first adoption score for the first client device, the first account profile associated with the first client device; and
store, in a second account profile on the memory, a second parameter indicating the acoustic acceptance of the feature by the second client device and including the second adoption score for the first client device, the second account profile associated with the second client device.

11. A method of selecting content items based on adoption of features to applications in computer networked environments, comprising:
providing, by a data processing system having one or more processors and memory, a first audio content item to a first client device and to a second client device, the first audio content item indicating an availability of a feature of an application, the feature of the application available since a launch time;
receiving, by the data processing system, from the first client device, at a first time, a first response indicating an acoustic acceptance of the feature of the application by the first client device;
receiving, by the data processing system, from the second client device, at a second time subsequent to the first time, a second response indicating an acoustic acceptance of the feature of the application by the second client device;
determining, by the data processing system, for the first client device, a first adoption score based on a function of a first time period elapsed between the first time corresponding to receipt of the first response and the launch time of the feature of the application and an inertia factor, the inertia factor to constrain adoption scores to a predefined range;
determining, by the data processing system, for the second client device, a second adoption score based on the function of a second time period elapsed between the second time corresponding to receipt of the second response and the launch time of the feature of the application and the inertia factor, the second time period greater than the first time period;
identifying, by the data processing system, the first client device as an early adopter based on the first adoption score for the first client device;
identifying, by the data processing system, the second client device as a late adopter based on the second adoption score for the second client device;
selecting, by the data processing system, for the first client device, a second audio content item based on the identification of the first client device and the first response indicating the acoustic acceptance of the feature of the application by the first client device;
selecting, by the data processing system, for the second client device, one of the second audio content item and a third audio content item based on the identification of the second client device and the second response indicating the acoustic acceptance of the feature of the application by the second client device;
providing, by the data processing system, the second audio content item to the first client device based on the identification of the first client device; and
providing, by the data processing system, at a time subsequent to the provision of the second audio content item to the first client device, one of the second audio content item and the third audio content item to the second client device based on the identification of the second client device.

12. The method of claim 11, comprising:
providing, by the data processing system, the first audio content item to the first client device to cause the first client device to playback the first audio content item indicating the availability of the feature of the application; and
providing, by the data processing system, the second audio content item to the second client device to cause the second client device to playback the second audio content item indicating the availability of the feature of the application.

13. The method of claim 12, comprising:
receiving, by the data processing system, from the first client device, at the first time, the first response indicating the acoustic acceptance of the feature of the application by the first client device, the acoustic acceptance corresponding to a speech feedback detected at the first client device; and
receiving, by the data processing system, from the second client device, at the second time subsequent to the first time, the second response indicating the acoustic acceptance of the feature of the application by the second client device, the acoustic acceptance corresponding to a speech feedback detected at the second client device.

14. The method of claim 11, comprising:
providing, by the data processing system, at a third time subsequent to providing the second audio content item, a fourth audio content item to the first client device, the fourth audio content item indicating an availability of a second feature to the application;
receiving, by the data processing system, from the first client device at a fourth time subsequent to the second time, a second response indicating an acoustic acceptance of the second feature by the first client device;
updating, by the data processing system, the first adoption score for the first client device based on the function of a time elapsed between the third time and the fourth time and the inertia factor; and
identifying, by the data processing system, the first client device as one of the early adopter and the late adopter based on the first adoption score.

15. The method of claim 11, comprising:
providing, by the data processing system, at a third time subsequent to providing the second audio content item, a fourth audio content item to the first client device, the fourth audio content item indicating an availability of a second feature to the application;
receiving, by the data processing system, from the first client device at a fourth time, a second response indicating an acoustic acceptance of the second feature by the first client device;
determining, by the data processing system, a third adoption score for the first client device based on a time elapsed between the third time and the fourth time;
identifying, by the data processing system, the first client device as the early adopter based on the third adoption score; and
determining, by the data processing system, an expected adoption time for a third client device based on the third adoption score and the identification of the first client device as the early adopter.

16. The method of claim 11, comprising:
determining, by the data processing system, the first adoption score for the first client device based on the function of the first time period and a first weight;
providing, by the data processing system, at a fourth time, a fourth content item to the first client device, the fourth content item indicating an availability of a second feature to the application;
receiving, by the data processing system, from the first client device at a fifth time subsequent to the fourth time, a second response indicating an acoustic acceptance of the second feature by the first client device;
updating, by the data processing system, the first adoption score for the first client device based on a third time period between the fourth time and the fifth time by a second weight different from the first weight; and
identifying, by the data processing system, the first client device as one of the early adopter and the late adopter based on the first adoption score.

17. The method of claim 11, comprising:
determining, by the data processing system, a distribution of the adoption of the feature from the first adoption score and the second adoption score;
determining, by the data processing system, that a percentage of early adoption for the feature is less than a threshold based on the distribution of the adoption of the feature; and
selecting, by the data processing system, the second audio content item, responsive to the determination that the percentage of early adoption for the feature is less than the threshold.

18. The method of claim 11, comprising:
determining, by the data processing system, that the first adoption score for the first client device is within a range of adoption scores associated with early adoption of the feature;
identifying, by the data processing system, the first client device as the early adopter, responsive to the determination that the first adoption score is within the range of adoption scores associated with the early adoption;
determining, by the data processing system, that the second adoption score for the second client device is within a range of adoption scores associated with late adoption of the feature; and
identifying, by the data processing system, the second client device as the late adopter, responsive to the determination that the second adoption score is within the range of adoption scores associated with the late adoption.

19. The method of claim 11, comprising:
determining, by the data processing system, that the first adoption score for the first client device is within a range of adoption scores associated with early adoption of the feature;
identifying, by the data processing system, the first client device as the early adopter, responsive to the determination that the first adoption score is within the range of adoption scores associated with the early adoption;
determining, by the data processing system, that the second adoption score for the second client device is within a range of adoption scores associated with late adoption of the feature; and
identifying, by the data processing system, the second client device as the late adopter, responsive to the determination that the second adoption score is within the range of adoption scores associated with the late adoption.

20. The method of claim 11, comprising:

storing, by the data processing system, in a first account profile on the memory, a first parameter indicating the acoustic acceptance of the feature by the first client device and including the first adoption score for the first client device, the first account profile associated with the first client device; and storing, by the data processing system, in a second account profile on the memory, a second parameter indicating the acoustic acceptance of the feature by the second client device and including the second adoption score for the first client device, the second account profile associated with the second client device.

* * * * *